(12) United States Patent
Dershem et al.

(10) Patent No.: US 8,555,746 B2
(45) Date of Patent: Oct. 15, 2013

(54) LINKAGE ARRANGEMENT

(75) Inventors: Brian R. Dershem, Fuquay-Varina, NC (US); Thomas P. Ewing, Stoke on Trent (GB); Matthew Flower, Kirby Muxloe (GB)

(73) Assignee: Caterpillar Inc., Peoria, IL (US)

( * ) Notice: Subject to any disclaimer, the term of this patent is extended or adjusted under 35 U.S.C. 154(b) by 404 days.

(21) Appl. No.: 12/487,775

(22) Filed: Jun. 19, 2009

(65) Prior Publication Data

US 2009/0314130 A1    Dec. 24, 2009

(51) Int. Cl.
*G05G 3/00*    (2006.01)

(52) U.S. Cl.
USPC .......................................................... 74/586

(58) Field of Classification Search
USPC ....................... 74/586; 403/119, 124; 280/442
See application file for complete search history.

(56) References Cited

U.S. PATENT DOCUMENTS

| 2,941,612 | A |   | 6/1960  | Bernotas |          |
|-----------|---|---|---------|----------|----------|
| 3,912,300 | A |   | 10/1975 | Bryan, Jr. |        |
| 4,135,597 | A |   | 1/1979  | Barth    |          |
| 4,165,793 | A | * | 8/1979  | Marsch et al. | 180/233 |
| 4,174,137 | A | * | 11/1979 | Ferris   | 384/208  |
| 4,310,061 | A | * | 1/1982  | Khanna et al. | 180/420 |
| 5,373,909 | A |   | 12/1994 | Dow et al. |        |
| 5,382,041 | A | * | 1/1995  | Keith    | 280/476.1 |
| 6,932,373 | B2 | * | 8/2005 | Seebohm et al. | 280/442 |

FOREIGN PATENT DOCUMENTS

| DE | 3623347     | 2/1988  |
|----|-------------|---------|
| DE | 202006004352 | 7/2006 |
| EP | 1159869     | 12/2001 |
| FR | 2409901     | 6/1979  |
| FR | 2632265     | 12/1989 |
| JP | 5893675     | 6/1983  |

* cited by examiner

*Primary Examiner* — Vicky Johnson
(74) *Attorney, Agent, or Firm* — Leill & McNeil

(57) ABSTRACT

A linkage arrangement is disclosed to provide an articulated machine with an arrangement that allows two frame structures to both articulate and oscillate relative to one another. The linkage arrangement includes a three point pivot arrangement with an angled link. Two of the pivots provide for articulation while two of the pivots provide for oscillation. The two pivots involved for oscillation are of lower overall height than the overall height for the two pivots providing the articulation, thereby reducing overall machine height while maintaining structural integrity.

12 Claims, 5 Drawing Sheets

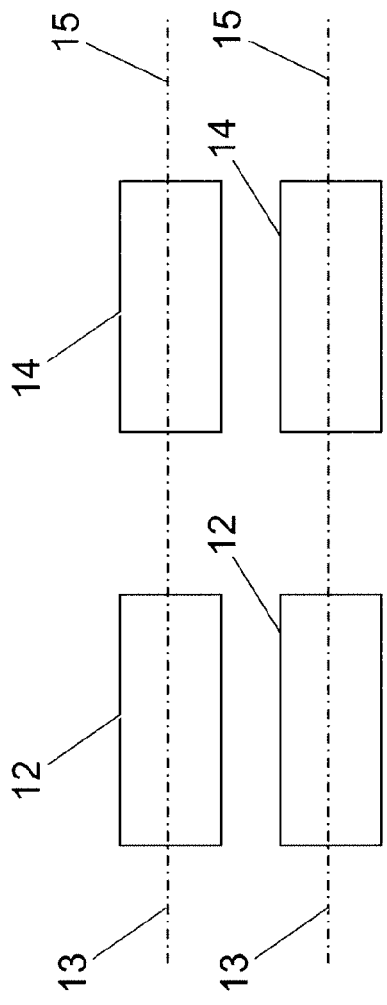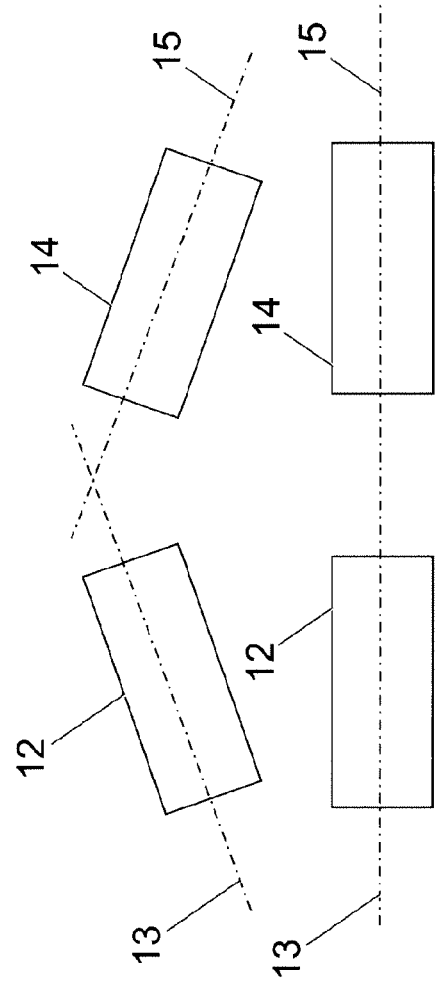
Fig. 4
Fig. 4a
Fig. 5
Fig. 5a

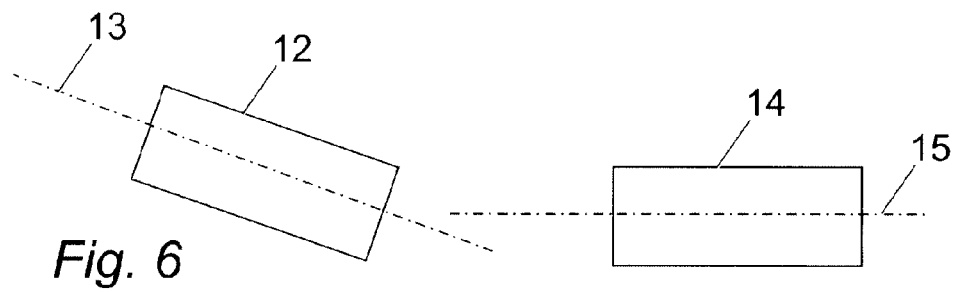
*Fig. 6*
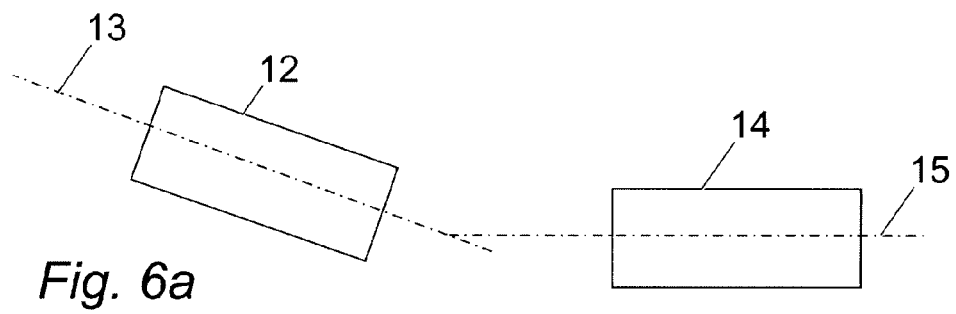
*Fig. 6a*
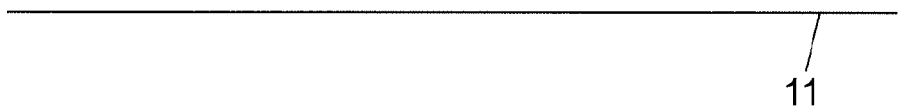
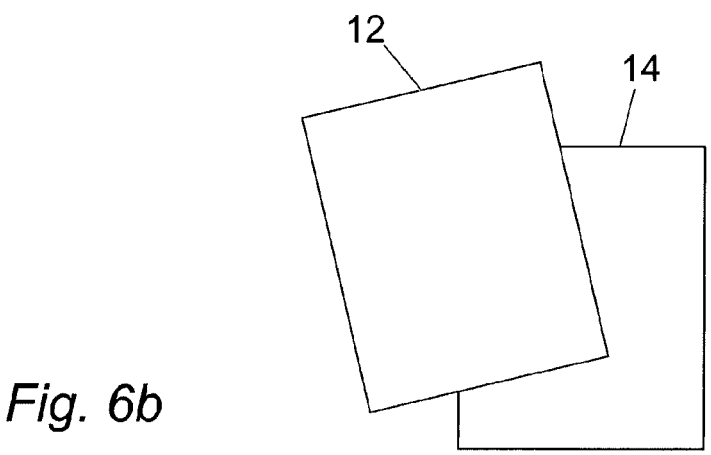
*Fig. 6b*
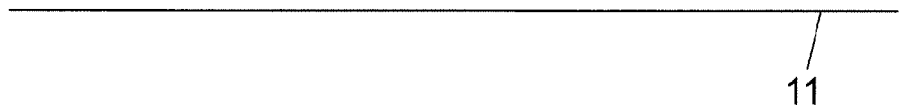

ary machine
LINKAGE ARRANGEMENT

PRIORITY STATEMENT

This application is the National Stage, filed under 35 U.S.C. §371, of International Application PCT/GB2007/004856 having an International Filing Date of Dec. 18, 2007 and published Jul. 3, 2008, as International Publication No. WO 2008/078072 A1. Applicant claims benefit of priority under 35 U.S.C. §119(a) and §365(b) of European Patent Application No. 06127059.1 filed Dec. 22, 2006.

TECHNICAL FIELD

This disclosure relates to linkage arrangements for frame structures and in particular to linkage arrangements including universal bearing arrangements for articulated machines such as wheeled loaders.

BACKGROUND

Articulated machines such as, for example, wheeled loaders and site dumpers are machines that use articulation of the body to steer the machine in particular directions. The machine is commonly divided into a front portion and a rear portion that at a neutral machine position are aligned with one another both vertically and horizontally. Such machines may be provided with pivot joints that allow a first front portion of the machine to be connected with a rear portion of the machine in such a manner that the front and rear portions can articulate and oscillate relative to one another. Articulation may thereby be described as that movement wherein the front and rear sections move relative to one another in a sideways manner. Oscillation may be described as that movement wherein the front and rear sections move relative to one another in an up-wards or downwards direction. Of course the two forms of movement may interact simultaneously.

Current designs, however, do tend to have taller structures due to several reasons; A larger size machine places large demands on the pivot and bearing arrangement as all forces between the two frame structures are guided through the pivot joints. To create a pivot moment large enough to handle all the forces placed on the joints, it is desirable to allow sufficient distance between the various joints. This, however, does tend to increase the size and especially the height of the machine as the lowest portion of the cab has to be placed above some of the bearing arrangement. Hence, one disadvantage associated with the prior art is that it fails to provide an arrangement allowing low overall machine heights while maintaining structural integrity.

The current disclosure is directed to overcoming one or more of the problems as set forth above.

SUMMARY

In a first aspect of the disclosure there is provided a linkage arrangement for an articulated machine including, a first frame structure having a first longitudinal axis, a second frame structure having a second longitudinal axis, a link member configured to connect the first and second frame structures, a first universal bearing arrangement for pivotably connecting the first frame structure to the link member, the first bearing arrangement having a first pivot center and a second universal bearing arrangement for pivotably connecting the second frame structure to the link member, the second bearing arrangement having a second pivot center. The first and second universal bearing arrangements are configured such that when the first and second longitudinal axes are substantially parallel and substantially horizontal the first and second pivot centers lie in different horizontal planes.

In a second aspect of the disclosure there is provided a linkage arrangement for an articulated machine including a first frame structure having a first longitudinal axis, a second frame structure having a second longitudinal axis, a link member configured to connect the first and second frame structures, a first universal bearing arrangement for pivotably connecting the first frame structure to the link member, the first bearing arrangement having a first pivot center lying in a first substantially horizontal plane, a second universal bearing arrangement for pivotably connecting the second frame structure to the link member, the second bearing arrangement having a second pivot center lying in a second substantially horizontal plane and a third universal bearing arrangement for pivotably connecting the first frame structure to the second frame structure, the third bearing arrangement having a third pivot center lying in a third substantially horizontal plane. The first, second and third universal bearing arrangements are configured such that when the first and second longitudinal axes are substantially parallel and substantially horizontal the distance between the first and third substantially horizontal planes is greater than the distance between the second and third substantially horizontal planes.

In a third aspect of the disclosure there is provided an articulated machine including a first frame structure having a first longitudinal axis, a second frame structure articulatedly connected to the first frame structure and having a second longitudinal axis, and a linkage arrangement connecting the first and second frame structures.

Other features and aspects of this disclosure will be apparent from the following description and the accompanying drawings.

BRIEF DESCRIPTION OF THE DRAWINGS

FIGS. 4 and 4a are schematic representations of the machine of FIG. 1 in a neutral position, FIG. 4 representing a plan view and FIG. 4a representing a side view.

FIGS. 5 and 5a are schematic representations of the machine of FIG. 1 in an articulated position, FIG. 5 representing a plan view and FIG. 5a representing a side view.

FIGS. 6, 6a, and 6b are schematic representations of the machine of FIG. 1 in an oscillated position, FIG. 6 representing a plan view, FIG. 6a representing a side view, and FIG. 6b representing a front view.

DETAILED DESCRIPTION

Figure 1:
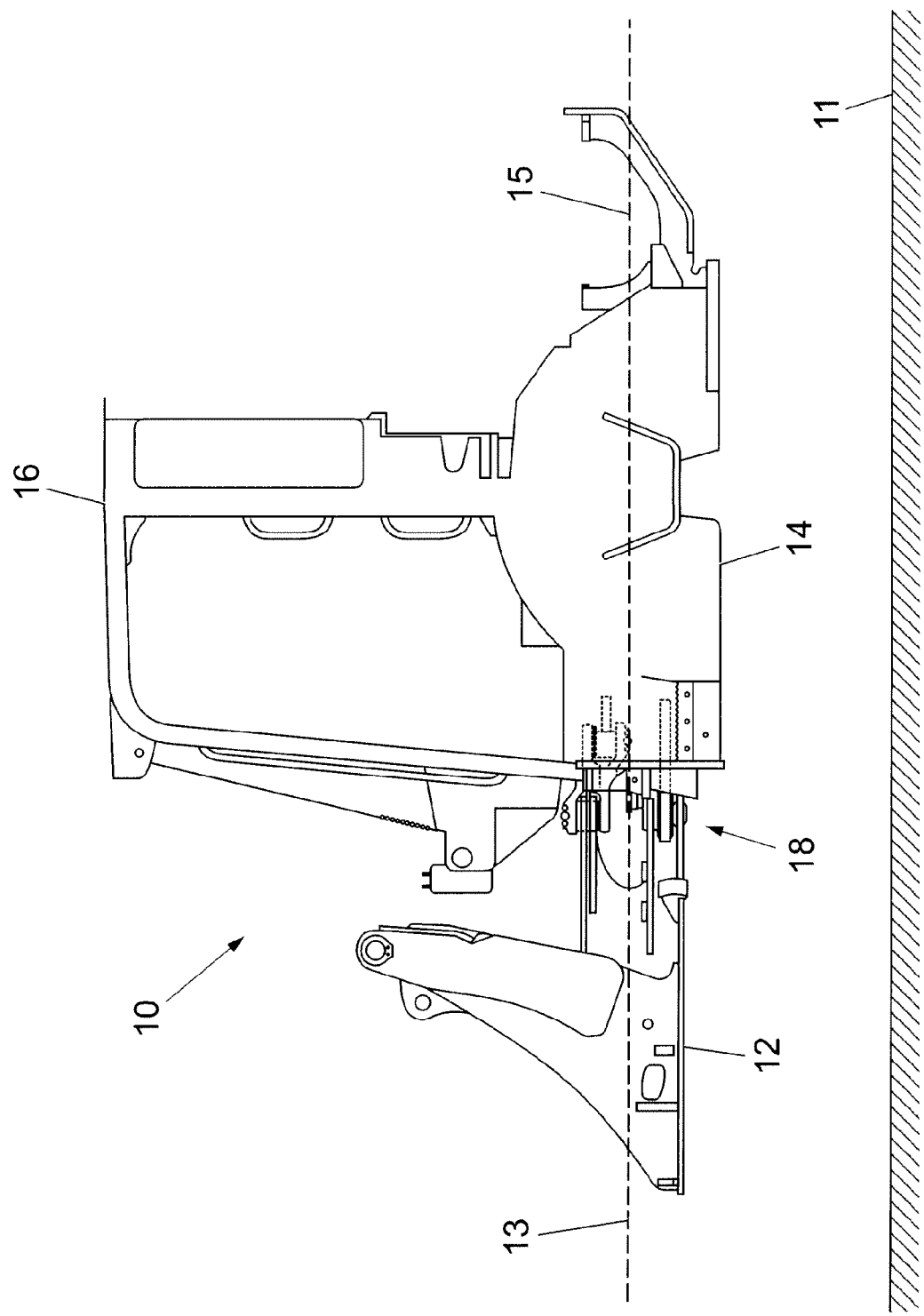
FIG. 1 shows a partial schematic view of an embodiment of an articulated machine in accordance with the current disclosures.

Now referring to FIG. 1, a portion of an exemplary machine 10 is shown. The machine 10 may be any suitable machine and in this embodiment may be described as an articulated wheel loader. The machine 10 may have a first frame structure 12 and a second frame structure 14. The first frame structure 12 may be regarded as a front portion of the machine 10 and may for example be provided with a work arm (not shown). The second frame portion 14 may be regarded as a rear portion of the machine 10 and may for example carry an operator platform 16, for example a cab. The first and second frame structures 12 and 14 have first and second longitudinal axes 13 and 15 respectively which are discussed in more detail below. The first and second frame structures 12 and 14 may be connected together via a linkage arrangement generally designated with numeral 18. The linkage arrangement 18 is shown in more detail in FIGS. 2 and 3.

Figure 2:
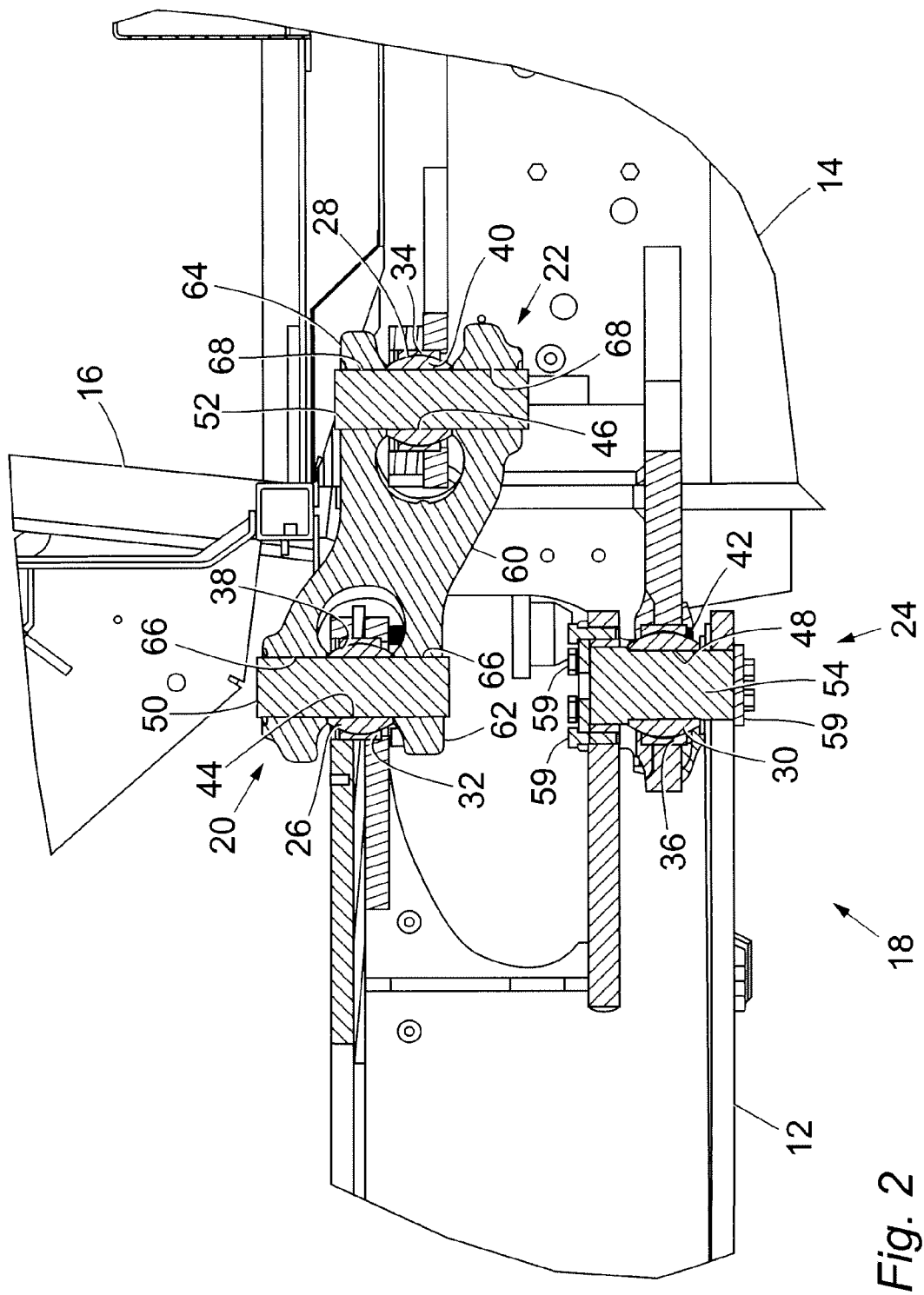
FIG. 2 is a more detailed cross-sectional view of the articulated joint of the machine of FIG. 1.
Figure 3:
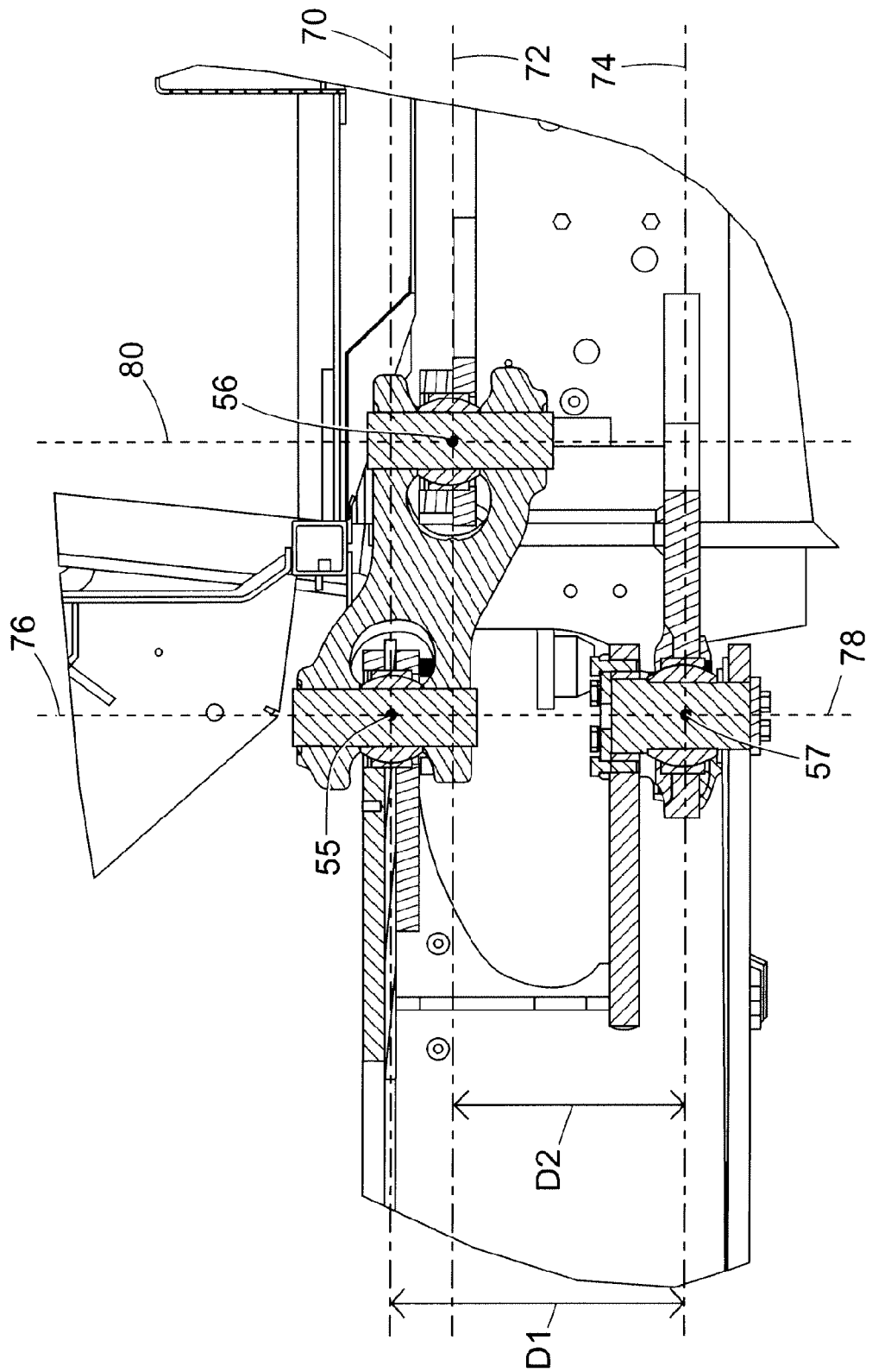
FIG. 3 is the same as FIG. 2 showing a multitude of defined planes, axes and reference points.

The linkage arrangement 18 as shown in more detail in FIGS. 2 and 3 may include various bearing portions such as the first, second and third universal bearing arrangements generally designated with numerals 20, 22 and 24 respectively. Each of the universal bearing arrangements 20, 22 and 24 may include bearings 26-30 which may have first, second and third housing portions 32, 34 and 36 with first, second and third curved portions 38, 40 and 42 in the housing portions 32-36 such that the curved portions 38-42 and their corresponding housing portions 32-36 are rotatably fixed with each other. The curved portions 38-42 and the housing portions 32-36 may be able to rotate relative to one another in more than one plane thereby providing multiple degrees of freedom for pivoting movement between the housing portions 32-36 and the curved portions 38-42 and any components attached thereto while also providing self-aligning properties. The bearings 26-30 may for example be bearings that are commonly referred to as spherical bearings.

The curved portions 38-42 may have first, second and third central bores 44, 46 and 48 extending at least partially therethrough. In one embodiment the central bores 44-48 extend completely through the curved portions 38-42.

The universal bearing arrangements 20-24 may have first, second and third pivot centers 55, 56 and 57, respectively, which may be defined as the centers around which the pivot action of each of the universal bearing arrangements 20-24 takes place. The pivot centers 55-57 may lie in planes 70, 72 and 74, respectively, which is described below.

The universal bearing arrangements 20-24 may have first, second and third link pins 50, 52 and 54 that extend at least partially through the central bores 44-48 and extend at least partially into or through at least one of the frame structures 12 and 14. Each of the first, second and third link 50-54 pins may define a first, second and third longitudinal pin axis 76, 78 and 80 respectively.

The linkage arrangement 18 may further include a link member 60. In one embodiment the link member 60 may be an angled link having first and second opposing end portions 62 and 64. The end portions 62 and 64 may both be generally U-shaped and may be configured such that they can receive at least a portion of the spherical bearings 26 and 28. The end portions 62 and 64 may further have bores 66 and 68 extending at least partially therethrough to receive the link pins 50-52 respectively.

In one embodiment the universal bearing arrangements 20 and 22 are configured such that the housing portions 32 and 34, but not the link pins 50 and 52, are mechanically fixed in the frame structures 12 and 14 respectively. This allows the link pins 50 and 52 to change position relative to both the frame structures 12 and 14.

In one embodiment the universal bearing arrangement 24 is configured such that the link pin 54 is mechanically fixed in the frame structure 12 by a fastening arrangement 59 and the link pin 54 is therefore positionally fixed to the frame structure 12.

INDUSTRIAL APPLICABILITY

FIGS. 5-6b are schematic diagrams convenient for explaining the operation of an embodiment of the current linkage arrangement. It is to be understood that the diagrams in FIGS. 5-6b are exemplary only and any depicted movement may be exaggerated for clarity purposes. It is to be understood that when referring to FIGS. 4-6b it is to be clear that the positional and axial references are based on a substantially flat and horizontal base line such as base line 11 as shown in FIG. 1. For clarity purposes not all components of the machine 10 are shown in FIG. 1, but the base line 11 could for example be regarded as the surface upon which the machine 10 is supported. In each of the side views as depicted in FIGS. 4a, 5a, 6a and 6b, the base line 11 is represented for convenience.

FIGS. 4 and 4a represent the orientation of the first and second frame structures 12 and 14 relative to one another as depicted in FIGS. 1 and 2. The machine 10 has substantially no articulation or oscillation such that the first and second longitudinal axes 13 and 15 are substantially parallel and substantially horizontal.

FIGS. 5 and 5a represent the orientation of the first and second frame structures 12 and 14 relative to one another when the machine 10 is articulated, for example for steering purposes. The steering system may be of any suitable type and is not depicted in any of FIGS. 1-6b. It can be seen from FIG. 5 that in a plan view the longitudinal axes 13 and 15 no longer align and no longer lie in the same plane. However, from a side view as shown in FIG. 5a the longitudinal axes 13 and 15 still appear aligned, as they are still lying in the same plane. The longitudinal axes 13 and 15 are therefore still substantially horizontal.

FIGS. 6, 6a and 6b represent the orientation of the first and second frame structures 12 and 14 relative to one another when the machine 10 is oscillated. This may for example happen when one of the front wheels (not shown) of the machine 10 is lifted from the base line 11 by for example an obstacle. This may result in one corner of the frame structure 12 being lifted upwards and side-wards. FIG. 6b depicts how the frame structure 12 may move and rotate relative to the frame structure 14. Oscillation may have multiple components of relative movement between the frame structures 12 and 14 and it is to be understood that part of the movements may be counteracted by the operator, by for example introducing an articulation to counter a natural articulation that may occur during oscillation. It can be seen from FIGS. 6, 6a and 6b that the longitudinal axes 13 and 15 are no longer aligned and no longer lie in the same plane. At least the longitudinal axis 13 is no longer substantially horizontal.

It can be seen that when the first and second longitudinal axes 13 and 15 are substantially parallel and substantially horizontal as represented in FIGS. 1-4a, the first, second and third pivot centers 55, 56 and 57 lie in different planes 70, 72 and 74 respectively. Each of the planes 70, 72 and 74 is substantially horizontal when the first and second longitudinal axes 13 and 15 are substantially parallel and substantially horizontal. It can also be seen that the first pivot center 55 in horizontal plane 72 lies below the second pivot center 56 in horizontal plane 70. The third pivot center 57 in horizontal plane 74 lies beneath both the horizontal planes 70 and 72.

For convenience, the relationships within the linkage arrangement when the first and second longitudinal axes 13 and 15 are substantially parallel, and substantially horizontal may also be described as follows; A distance D1 relates to the distance between the two planes 70 and 74 which are the planes associated with the pivot centers involved in providing articulation, i.e. the pivot centers 55 and 57. A distance D2 relates to the distance between the two planes, 72 and 74, which are the planes associated with the pivot centers involved in providing oscillation, i.e. the pivot centers 56 and 57. It can be seen that D1 is greater than D2.

When the first and second longitudinal axes 13 and 15 are substantially parallel and substantially horizontal as represented in FIGS. 1-4a, the longitudinal pin axes 76-80 are substantially parallel whereby the first and third longitudinal axes 70 and 78 are not only parallel, but are also substantially coaxial.

The invention allows the second universal bearing arrangement 22 to be lower compared to the prior art. The operator platform 16, which is mounted on the second frame portion 14 can thus be lower, thereby reducing the overall machine height while maintaining structural integrity.

Other aspects can be obtained from a study of the drawings, the specification, and the appended claims.

The invention claimed is:

1. A linkage arrangement for an articulated machine comprising:
   a first frame structure having a first longitudinal axis;
   a second frame structure having a second longitudinal axis, the second longitudinal axis being generally collinear in plan view with the first longitudinal axis when the articulated machine has no articulation;
   a link member configured to connect said first and second frame structures, said link member receiving at least a portion of said first and second frame structures;
   a first universal bearing arrangement for pivotably connecting said first frame structure to said link member, said first bearing arrangement having a first pivot center;
   a second universal bearing arrangement for pivotably connecting said second frame structure to said link member, said second bearing arrangement having a second pivot center;
   said first and second universal bearing arrangements being configured such that when said first and second longitudinal axes are substantially parallel and substantially horizontal said first and second pivot centers lie in different horizontal planes.

2. A linkage arrangement according to claim 1 further including a third universal bearing arrangement configured to connect said first frame structure with said second frame structure, said third universal bearing having a third pivot center and being configured such that when said first and second longitudinal axes are substantially parallel and substantially horizontal said third pivot center lies below said first and second pivot centers.

3. A linkage arrangement according to claim 2, wherein said first, second and third universal bearing arrangements each include a self-aligning spherical bearing including a housing portion and a curved portion arranged in said housing portion, said curved portion having a central bore, each of said universal bearing arrangements further including a link pin extending at least partially through said central bore.

4. A linkage arrangement according to claim 3, wherein said link pins of said first and third bearing arrangement define longitudinal axes that are substantially coaxial when said first and second longitudinal axes are substantially parallel and substantially horizontal.

5. A linkage arrangement according to claim 3, wherein said link pins of said first, second and third universal bearing arrangements define longitudinal axes that are substantially parallel to one another when said first and second longitudinal axes are substantially parallel and substantially horizontal.

6. A linkage arrangement according to claim 3, wherein said link member is an angled link having first and second generally U-shaped opposing end portions each configured to receive at least a portion of said spherical bearings and at least a portion of said link pins of said first and second universal bearing arrangements respectively.

7. A linkage arrangement according to claim 3, wherein the link pins of said first and second universal bearing arrangements can change position relative to said first and second frame structures while said link pin of said third universal bearing arrangement is positionally fixed relative to said first frame structure.

8. A linkage arrangement according to claim 2, wherein said first and third bearing enable said first and second frame structures to articulate relative to one another.

9. A linkage arrangement according to claim 2, wherein said second and third bearing enable said first and second frame structures to oscillate relative to one another.

10. A linkage arrangement for an articulated machine comprising:
    a first frame structure having a first longitudinal axis;
    a second frame structure having a second longitudinal axis,
    a link member configured to connect said first and second frame structures;
    a first universal bearing arrangement for pivotably connecting said first frame structure to said link member, said first bearing arrangement having a first pivot center lying in a first substantially horizontal plane;
    a second universal bearing arrangement for pivotably connecting said second frame structure to said link member, said second bearing arrangement having a second pivot center lying in a second substantially horizontal plane;
    a third universal bearing arrangement for pivotably connecting said first frame structure to said second frame structure, said third bearing arrangement having a third pivot center lying in a third substantially horizontal plane;
    said first, second and third universal bearing arrangements being configured such that when said first and second longitudinal axes are substantially parallel and substantially horizontal the distance between said first and third substantially horizontal planes is greater than the distance between said second and third substantially horizontal planes, each of the first, second and third substantially horizontal planes being different substantially horizontal planes.

11. A linkage arrangement for an articulated machine comprising:
    a first frame structure having a first longitudinal axis;
    a second frame structure having a second longitudinal axis,
    a link member configured to connect said first and second frame structures;
    a first universal bearing arrangement for pivotably connecting said first frame structure to said link member, said first bearing arrangement having a first pivot center; and
    a second universal bearing arrangement for pivotably connecting said second frame structure to said link member, said second bearing arrangement having a second pivot center;
    wherein the first and second universal bearing arrangements are configured such that when said first and second longitudinal axes are substantially parallel and substantially horizontal said first and second pivot centers lie in different horizontal planes;
    the first and second universal bearing arrangements each include a self-aligning spherical bearing including a housing portion and a curved portion arranged in said housing portion, said curved portion having a central bore, each of said universal bearing arrangement further including a link pin extending at least partially through said central bore; and said link member is an angled link having first and second generally U-shaped opposing end portions each configured to receive at least a portion of said spherical bearings and at least a portion of said link pins of said first and second universal bearing arrangements respectively.

12. A linkage arrangement for an articulated machine comprising:

a first frame structure having a first longitudinal axis;

a second frame structure having a second longitudinal axis, a link member configured to connect said first and second frame structures;

a first universal bearing arrangement for pivotably connecting said first frame structure to said link member, said first bearing arrangement having a first pivot center;

a second universal bearing arrangement for pivotably connecting said second frame structure to said link member, said second bearing arrangement having a second pivot center; and a third universal bearing arrangement configured to connect said first frame structure with said second frame structure;

wherein the first and second universal bearing arrangements being configured such that when said first and second longitudinal axes are substantially parallel and substantially horizontal said first and second pivot centers lie in different horizontal planes;

the first, second and third universal bearing arrangements each include a self-aligning spherical bearing including a housing portion and a curved portion arranged in said housing portion, said curved portion having a central bore, each of said universal bearing arrangements further including a link pin extending at least partially through said central bore; and the link pins of said first and second universal bearing arrangements can change position relative to said first and second frame structures while said link pin of said third universal bearing arrangement is positionally fixed relative to said first frame structure.

* * * * *